(12) United States Patent
Nair

(10) Patent No.: US 6,195,746 B1
(45) Date of Patent: Feb. 27, 2001

(54) DYNAMICALLY TYPED REGISTER ARCHITECTURE

(75) Inventor: Ravindra Kumar Nair, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/791,895

(22) Filed: Jan. 31, 1997

(51) Int. Cl.[7] .................................................. G06F 15/00
(52) U.S. Cl. ........................ 712/217; 712/23; 712/24; 712/27; 712/43; 712/210; 712/211; 712/212
(58) Field of Search .................... 395/800.23, 800.24, 395/800.27, 800.43; 712/23, 24, 27, 43, 210, 212, 211, 47

(56) References Cited

U.S. PATENT DOCUMENTS

| | | | |
|---|---|---|---|
| 4,814,978 | 3/1989 | Dennis | 364/200 |
| 5,045,992 | 9/1991 | Yates, Jr. et al. | 364/200 |
| 5,175,856 | 12/1992 | Van Dyke et al. | 395/700 |
| 5,187,796 | 2/1993 | Wang et al. | 395/800 |
| 5,265,218 * | 11/1993 | Testa et al. | 395/280 |
| 5,339,419 | 8/1994 | Chang et al. | 395/700 |
| 5,412,784 | 5/1995 | Rechtschaffen et al. | 395/375 |
| 5,420,992 * | 5/1995 | Killian et al. | 395/500 |
| 5,428,754 | 6/1995 | Baldwin | 395/375 |
| 5,471,591 * | 11/1995 | Edmonson et al. | 395/393 |
| 5,493,675 | 2/1996 | Falman, Jr. et al. | 395/375 |
| 5,526,500 | 6/1996 | Tanksalvala et al. | 395/375 |
| 5,539,911 | 7/1996 | Nguyen et al. | 395/800 |
| 5,568,630 * | 10/1996 | Killian et al. | 395/376 |
| 5,715,420 * | 2/1998 | Kahle et al. | 711/206 |
| 5,765,206 * | 6/1998 | Hohensee et al. | 711/203 |
| 5,893,145 * | 4/1999 | Thayer et al. | 712/204 |
| 5,903,772 * | 5/1999 | White et al. | 712/33 |

* cited by examiner

Primary Examiner—John A. Follansbee
Assistant Examiner—Dzung C. Nguyen
(74) Attorney, Agent, or Firm—Charles K. Salys; Felsman, Bradley, Vaden, Gunter & Dillon, LLP

(57) ABSTRACT

Dynamically typed registers in a processor are provided by associating a type specifier with a register specifier for each register in the processor, storing the register specifiers and associated type specifiers in a register type table. The type specifier associated with an operand register of an instruction is employed to dispatch the instruction to an appropriate execution unit within the processor. The results of the instruction are stored in a register having an associated type specifier matching the execution unit type. Register specifiers are dynamically allocated to particular execution units within the processor by altering the type specifier associated with the register specifiers. Register values may be either discarded or converted when the register specifier type is altered. A general instruction allows conversion of the value from one type to another without storing the converted value in memory.

34 Claims, 5 Drawing Sheets

| Opcode | Instructions |
|---|---|
| 00000000 | Reserved |
| 00000001<br>⋮<br>01111111 | Type-dependent |
| 10000000<br>⋮<br>11011111 | Type-independent |
| 11100000<br>⋮<br>11111111 | LOAD |

*Fig. 3*

DYNAMICALLY TYPED REGISTER ARCHITECTURE

BACKGROUND OF THE INVENTION

1. Technical Field

The present invention relates in general to processors in data processing systems and in particular to the architecture of instruction sets and registers in such processors. Still more particularly, the present invention relates to an instruction set architecture and register architecture in a processor which allows registers to be dynamically typed.

2. Description of the Related Art

Processors in data processing systems include a number of registers used to store operands for the instructions executed by the processor. Typically this includes registers dedicated for use in execution of a particular type of instruction, such as floating point registers. A block diagram of a conventional processor architecture is depicted in FIG. 1. Processor 100 includes a bus interface unit 102 which controls the flow of data between processor 100 and the remainder of the data processing system (not shown). Bus interface unit 102 is connected to both a data cache 104 and an instruction cache 106. Instruction cache 106 supplies instructions to branch unit 108, which determines what sequence of instructions is appropriate given the contents of general purpose registers (GPRs) 110 and floating point registers (FPRs) 112 in processor 100, the availability of load/store unit 114, fixed point execution unit 116, and floating point execution unit 118, and the nature of the instructions themselves. Branch unit 108 forwards the ordered instructions to dispatch unit 120, which issues the individual instructions to the appropriate execution or function unit (load/store unit 114, fixed point execution unit 116, or floating point execution unit 118). point execution unit 116 reads data from general purpose registers 110, while floating point execution unit 118 reads data from floating point registers 112. Load/store unit 114 reads data from general purpose registers 110 or floating point registers 112 and writes data to data cache 104 or to an external memory (not shown) depending on the memory hierarchy and caching protocol employed by the data processing system. Load/store unit 114 also reads data from data cache 104 and writes the data to general purpose registers 110 and floating point registers 112.

Use of separate register types in processors represents a trade-off, dedicating processor area to improve performance of specific operations within the processor. While there are advantages to employing registers of a specific type associated with a function unit operating predominately on operands of that type, static dedication of such registers precludes flexibility which would allow dynamic allocating of registers based on anticipated need. When registers of a particular type are implemented as fast registers close to the associated execution unit, static definition of register type also either requires that a sufficient number of registers be implemented to satisfy the greatest projected demand or degrades performance as a result of "register bottleneck." Registers which are statically defined and shared by multiple execution units of different types requires both that values in such registers be bussed across large distances in the processor and that large numbers of ports be provided for each register. Sharing of register types by different types of execution units complicates register dependency problems and scheduling of instructions for parallel execution.

Static register types also preclude extension of instruction sets, preventing accommodation of new functions and data types after the initial instruction set for the processor has been defined. The instruction sets used in conjunction with static register types typically do not include generic instructions for converting a register value from one data type to another. The processor architectures typically require that converted values be transferred to memory before loading them into new registers. Utilizing static register types and shared registers creates difficulties in saving and restoring register values at subroutine call boundaries and at context switch points.

It would be advantageous, therefore, to permit a compiler to dynamically allocate registers from a pool of available registers to specific data types and to support such dynamic allocation in the processor. It would further be advantageous to enable conversion of values from one data type in one register to another without requiring transfer of the converted value to memory, but permitting the converted value to be transferred directly from one register type to another.

SUMMARY OF THE INVENTION

It is therefore one object of the present invention to provide an improved processor for a data processing system.

It is another object of the present invention to provide an improved register architecture and instruction set architecture for processors in a data processing system.

It is yet another object of the present invention to provide an instruction set architecture and register architecture in a processor for a data processing system which allows registers to be dynamically typed.

The foregoing objects are achieved as is now described. Dynamically typed registers in a processor are provided by associating a type specifier with a register specifier for each register in the processor, storing the register specifiers and associated type specifiers in a register type table. The type specifier associated with an operand register of an instruction is employed to dispatch the instruction to an appropriate execution unit within the processor. The results of the instruction are stored in a register having an associated type specifier matching the execution unit type. Register specifiers are dynamically allocated to particular execution units within the processor by altering the type specifier associated with the register specifiers. Register values may be either discarded or converted when the register specifier type is altered. A general instruction allows conversion of the value from one type to another without storing the converted value in memory.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a table of opcodes for the instruction set used with dynamically typed registers in accordance with a preferred embodiment of the present invention;

DETAILED DESCRIPTION OF THE PREFERRED EMBODIMENT

Figure 1:
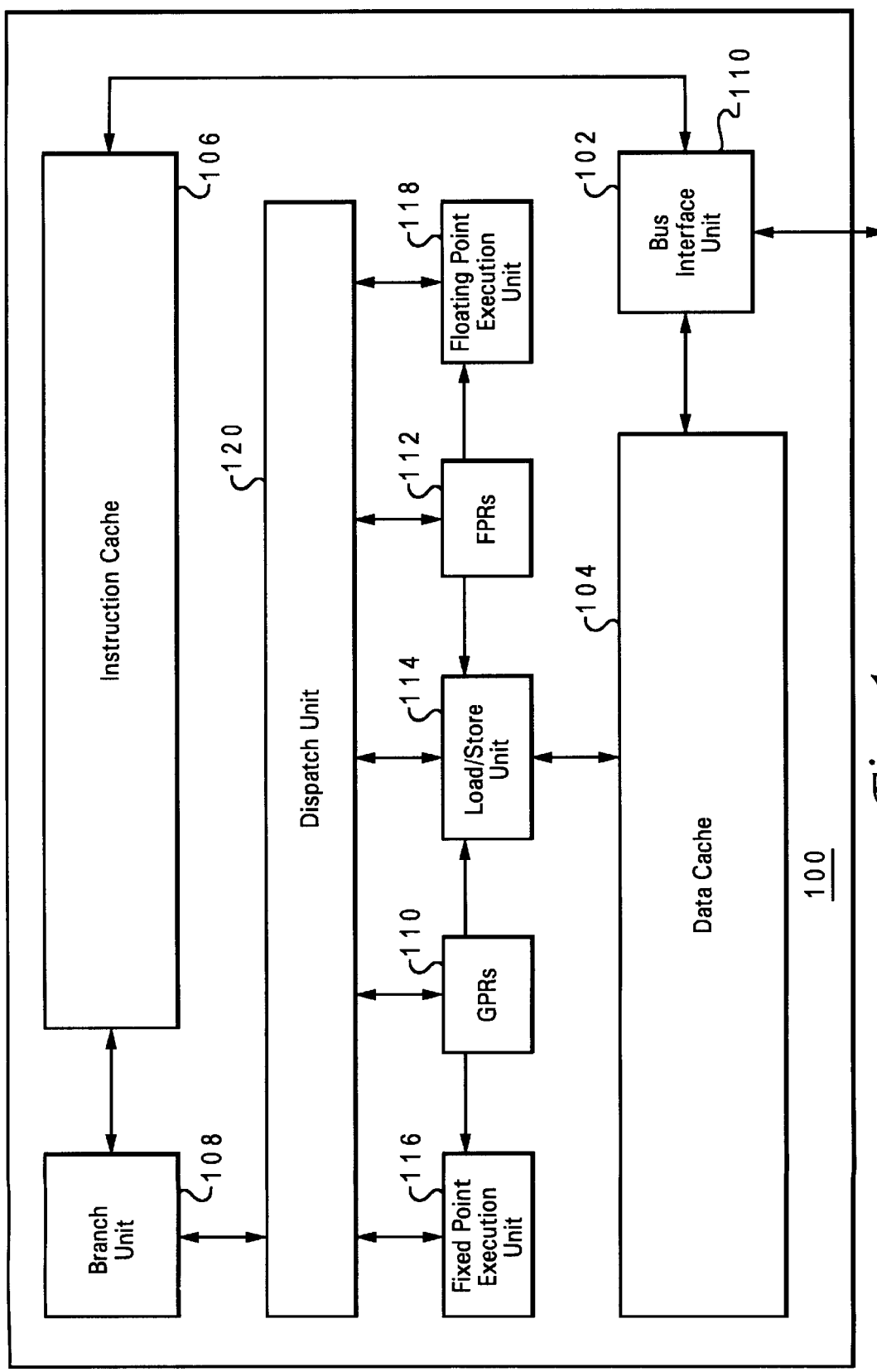
FIG. 1 depicts a conventional processor architecture.
Figure 2:
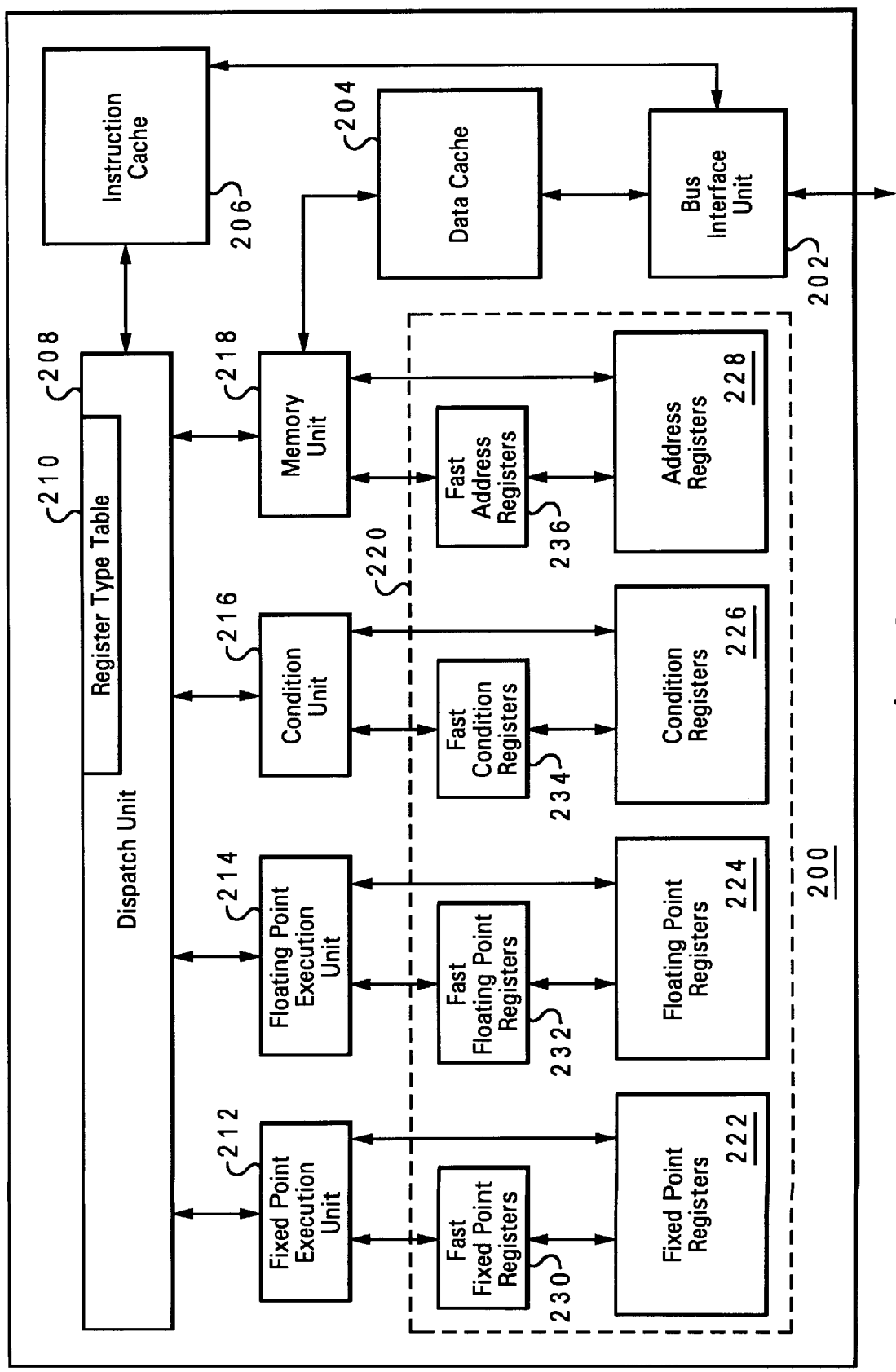
FIG. 2 is a block diagram of a simple implementation of a processor including dynamically typed registers in accordance with the present invention.

With reference now to the figures, and in particular with reference to FIG. 2, a block diagram illustrating a simple implementation of a processor including dynamically typed registers in accordance with the present invention is portrayed. This simple implementation will be used to illustrate the principles of the present invention.

As with conventional processor architectures, processor 200 includes a bus interface unit 202, a data cache 204, an instruction cache 206, and a dispatch unit 208. However, dispatch unit 208 includes register type table 210, which specifies the type for each register which may potentially appear as a name in the source specifier field of the current instruction. Unless the instruction is a LOAD, STORE, or CAST instruction, register type table 210 also inherently specifies the type for the target register which may appear in an instruction. As in conventional processor architectures, dispatch unit 208 issues individual instructions to the appropriate execution unit within processor 200 for execution.

Processor 200 includes four basic execution units: fixed point execution unit 212, floating point execution unit 214, condition unit 216, and memory unit 218. Only these four execution units are required to support the functionality of most contemporary processor instruction sets. Additional execution units may be implemented, as described below, at the expense of processor area, complexity, and cost.

Condition unit 216 serves the function of branch units in conventional processor architectures. Condition unit 216 differs from conventional branch units since, as a result of the implementation of condition type registers as described below, no packing of conditions occurs. Logical operations in condition unit 216 are performed between condition registers rather than fields in a single composite register realized in prior art processors. Because BRANCH instructions may be executed in parallel with subsequent instructions without degrading performance if the subsequent instructions employ processor resources which would otherwise remain idle, condition unit 216 may be situated either before or after dispatch unit 208 in the processing stream.

Memory unit 218 also operates on its own type registers—address type registers—rather than using fixed-point (or general purpose) registers as is common in contemporary processors. Memory unit 218 performs the LOAD and STORE operations executed by load/store units in conventional processors. Memory unit 218 performs address computation using values in the address registers, supporting operations on those values such as shift, add, subtract, multiply, and performing logical operations.

Each of the execution units—fixed point execution unit 212, floating point execution unit 214, condition unit 216, and memory unit 218—is capable of accessing dynamically typed registers 220. Instructions executed by the execution units identify operands by a register specifier or register name, which may be mapped to any register within dynamically typed registers 220. Register specifiers each have an associated type specifier identifying the type of execution or function unit to which the register specifier is currently allocated. Any register specifier may be allocated to any execution unit by associating an appropriate type specifier with the register specifier. Changing the type specifier changes the execution unit to which the register specifier is allocated or mapped, thus permitting dynamic allocation of register specifiers or names.

Each register specifier and associated type specifier are stored in register type table 210. Register specifiers are preferably 8 bits long, allowing a total of 256 registers to be named at any given time, while type specifiers are preferably 4 bits long, allowing a total of 15 types of execution units to be implemented with one value (e.g., the 0 type) specifying "invalid" or "unimplemented."

Physically, a full complement of registers within dynamically typed registers 220 may be implemented for each execution unit, preferably with some as fast registers close to the execution unit. Thus, fixed point execution unit 212 has an associated set of fast fixed point registers 222, floating point execution unit 214 has an associated set of fast floating point registers 224, condition unit 216 has an associated set of fast condition registers 226, and memory unit 218 has an associated set of fast address registers 228. For an 8-bit register specifier, each execution unit would have an associated set of 256 fast registers. Register specifiers allocated to one of these execution units in register type table 210 are mapped to those associated fast registers. Changing the type specifier for a particular register specifier—and thus allocating the register specifier to a different execution unit—will result in that register specifier being mapped to a register within the set associated with the new execution unit.

The allocation of register specifiers for dynamically typed registers 220 to an execution unit may be initially determined by the operating system and/or altered by an active user application based on the types of operations which the application expects to perform. Some applications may not require use of certain execution units, such as floating point execution unit 214, and therefore would allocate no registers to that unit.

For an 8-bit register specifier, each execution unit may have 256 fast registers, although only those registers allocated register specifiers are used in executing instructions. At any given time, all available register specifiers may be allocated to registers within dynamically typed registers 220 associated with a specific execution unit. Fewer than the full complement of registers associated with an execution may be allocated a register specifier. Thus, the fast register complement for each execution unit acts like a fully-associative cache for 256 possible architected registers. Architected registers are those registers which the instruction set defines and the compiler uses. Implementing at least some of dynamically typed registers 220 as fast registers close to the execution units avoids the delays associated with accessing large register files. Dynamically typed registers 220 may be implemented as physical registers 222, 224, 226, and 228 for each execution unit as shown in FIG. 2 or, other than fast registers 230, 232, 234, and 236, may be mapped into locations in memory.

The number and distribution of fast register files may vary from one implementation of the dynamically typed register architecture to another. Some execution units, such as condition unit 216 may not require as many registers as another execution unit, such as the floating point unit. The determination of the number of fast registers associated with a specific execution unit should be guided by the extent of use of that register type in commonly encountered code, which may vary from implementation to implementation.

Alternatively, a single group of dynamically typed registers 220 may be implemented. The type specifier associated with the register name in register type table 210 identifies the execution unit to which the register specifier is currently allocated and the manner in which values contained within the registers should be interpreted. Type specifiers in register type table 210 may be changed by LOAD and CAST instructions, described below. When a register specifier in register type table 210 changes type, the value contained in the physical register associated with the register specifier becomes invalid and may be discarded.

In yet another alternative, dynamically typed registers 220 need not correspond to physical registers at all, but may be implemented in memory. This alternative conserves processor area, avoiding the space required to implement 256 registers for each execution unit, at the expense of performance.

The register type for the first source operand of an instruction is determined from the register type table 210 and the entry in register type table 210 for the target is updated. Two register types basic to all dynamically typed register implementations—the address type and the condition type—have already been identified above. Given the large addressing requirements of emerging applications, address registers 228 should be 64 bits long. Condition registers 226 contain a value upon which BRANCH instructions predicate the next instruction to be executed. Condition registers 226 typically contain a 1-bit value which allows the BRANCH instruction to choose between two possible instruction streams for the next instruction, one of which may be the current stream. If 2-bit values are permitted in condition registers 226, a BRANCH instruction may choose between three streams in addition to the current instruction stream.

With reference now to FIG. 3, a table of opcodes for the instruction set used with dynamically typed registers in accordance with a preferred embodiment of the present invention is depicted. The format of an instruction used in conjunction with dynamically typed registers is similar to that of instructions in most contemporary general purpose architectures. An instruction will always comprise an associated opcode field, one and only one target specifier field, and one or more source specifier fields. Target specifiers may be a register name or a memory address specifier, while a source specifier may be an immediate value in the instruction, a register name, or a memory address specifier. Only BRANCH and STORE instructions will have a memory address specifier as a target specifier, and only LOAD instructions will have a memory address specifier as a source specifier. A memory address specifier may be an immediate value, a pair of register specifiers, or a register specifier with a displacement value. In addition to target and source specifiers, LOAD and CAST instructions will also have a target type specifier field.

The opcode of an instruction, which is preferably 8 bits long, is encoded to indicate the nature of the instruction. Table 300 depicts an allocation of 8-bit opcodes to three different classes of instructions. The opcode 1110xxxx and 1111 xxxx are reserved to specify two forms of LOAD instructions, a displacement form and an indexed form. The "xxxx" field in the above opcodes is an embedded or internal type specifier, defining the type specifier for the target register. Execution of the LOAD instruction alters the type specifier for the instruction's target register to match the embedded type specifier. The register referred to in the source specifier of LOAD instructions will be of the address type.

Of the remaining 224 opcodes in table 300, the 96 other opcodes having the form 1xxxxxxx specify type-independent instructions, such as BRANCH, STORE, and CAST instructions. The registers identified in the target specifier of BRANCH or STORE instructions will be of the address type. The source specifier, if any, of a BRANCH instruction will identify a register of the condition type. As noted above, CAST instructions will include a target type specifier which may be embedded in the opcode field as achieved with LOAD instructions.

All opcodes of the type 0xxxxxxx, excluding 00000000, are interpreted by the individual execution units. These instructions, which may be referred to as "general instructions," are dispatched to execution units based on the type specifier associated with the first source register specifier in the register type table. Thus, each execution unit may specify up to 127 distinct instructions, with the same opcode being interpreted differently by different execution units. Since a maximum of 15 execution units may be implemented, this architecture allows for up to 1905 different operations, which would require a 12-bit opcode field in a traditional instruction set architecture. However, the 8-bit opcode field size given as an example, as with the 8-bit register specifier and the 4-bit type specifier, is based on currently practical implementations. Other choices may result in instruction sets of different sizes.

Referring again to FIG. 2, in execution of instructions, processor 200 first determines from the opcode field whether the instruction is a LOAD, STORE, CAST, BRANCH, or a general instruction. If the instruction is a general instruction, dispatch unit 208 dispatches the instruction to an execution unit based on the type specifier associated with the first source register in register type table 210. LOAD and STORE instructions are sent to memory unit 218, while BRANCH instructions are dispatched to condition unit 216. CAST instructions are dispatched to the unit identified by the type specifier of its first source operand. An implementation could send an instruction to additional function unit types to facilitate bookkeeping or to simplify hardware. In the case of LOAD, STORE, CAST and BRANCH instructions, more than one type of execution unit is involved. While there is a dominant unit where the operation is performed, it will usually be necessary to send synchronizing information to the other execution unit.

At each execution unit (such as fixed point execution unit 212, floating point execution unit 214, condition unit 216, and memory unit 218), the opcode is completely decoded to determine the exact operation to be performed by the execution unit on the specified operands. For general instructions, the same opcodes may specify different functions at different execution units since the opcodes are decoded separately at each execution unit.

In general instructions, execution of an instruction generates a result of the type specific to the execution unit which executed the instruction. There are no other "side-effects" for an instruction. This is in contrast to architectures where addition operations, for example, may also produce condition bits indicating whether the result of the addition was positive, zero, or negative. Results generated by execution of the instruction are stored in the specified target register in the unit where they were generated. LOAD and CAST instructions forward the operation's result to the execution unit appropriate to the target register type. Typically these operations will incur a processing latency, which should be accounted for by the compiler when the code is scheduled.

CAST instructions convert a register value or operand from one type to another, and thus generate a result of the type specified by the type specifier field in the instruction. Conversion is intentionally explicit to insure that it is performed as infrequently as possible and is carefully scheduled for overlapped execution with other instructions in the program. A conversion between types should be supported by the architecture and, if not, should generate a run-time exception. Conversions between two types may be trivial or complex. For example, conversion of a 1-bit condition to an unsigned 32-bit integer involves simply transferring the single bit to the least significant bit of a 32-bit register. Converting a double-precision floating point number to a signed 32-bit integer, on the other hand, would require a double-to-int conversion in hardware. Condition evaluating instructions are a special case of CAST instructions in which the target register is a condition-type register and the result is obtained, for example, by performing a compare of two operands of the same type as the execution unit.

Figure 4:
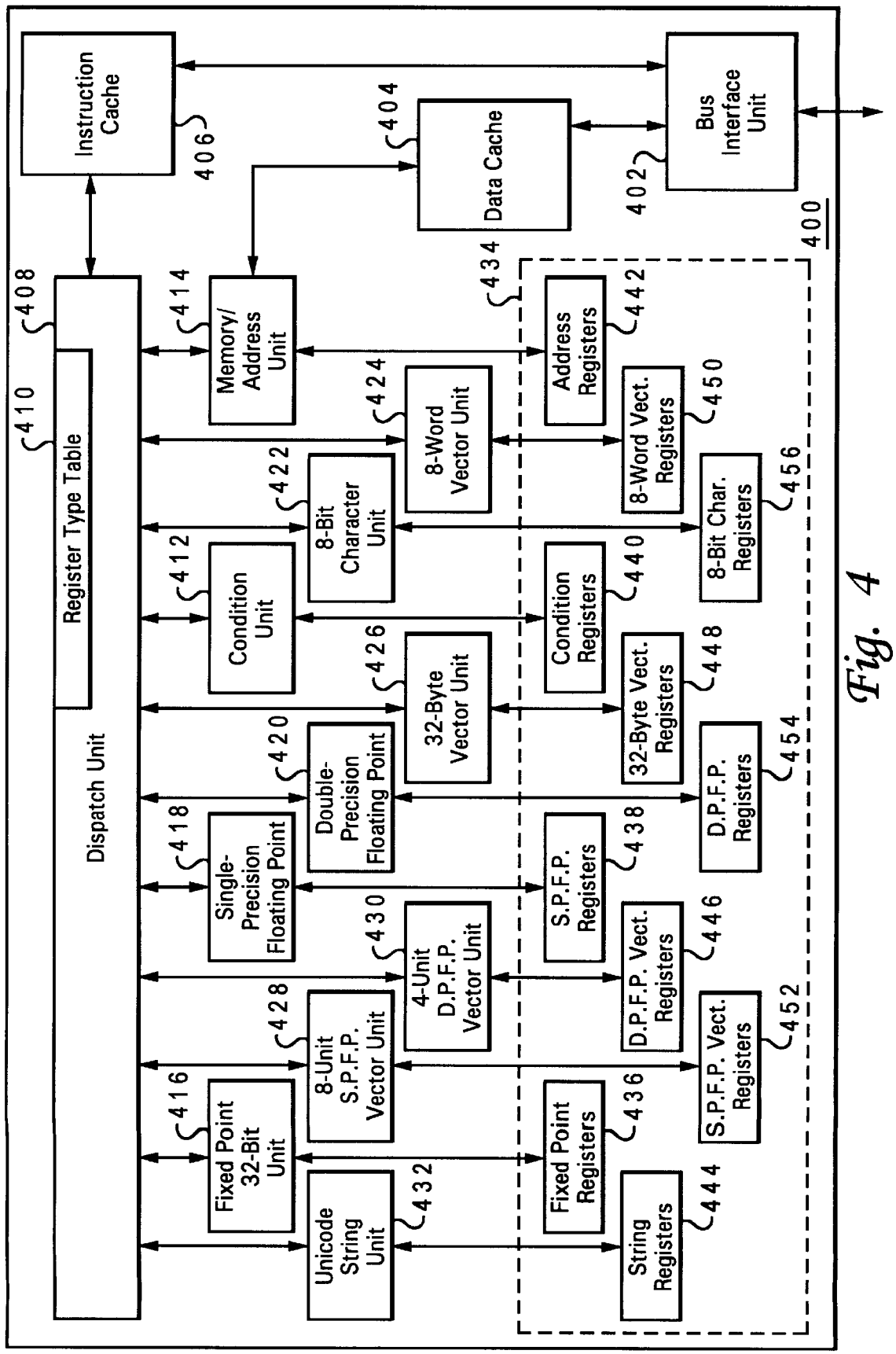
FIG. 4 is a block diagram of an implementation of a processor including dynamically typed registers in accordance with a preferred embodiment of the present invention.

Referring to FIG. 4, a block diagram of an implementation of a processor including dynamically typed registers in accordance with a preferred embodiment of the present invention is portrayed. As with the simple implementation described above, processor 400 includes bus interface unit 402, data cache 404, instruction cache 406, and dispatch unit 408 including register type table 410. Processor 400 also includes condition unit 412 and memory or address unit 414.

Fixed point execution unit 416 is preferably a pure 32-bit unit rather than a hybrid fixed point execution unit supporting byte-length operations, such as may be found in various conventional processor architectures. Most contemporary operating systems and applications employ integers which are 32-bits long. Most operations requiring byte-length operands arise from either the treatment of Boolean conditions or the manipulation of characters. The former class of operations is handled in condition unit 412, while the latter group is best treated by a separate string unit, Unicode string unit 432. Alternatively, byte-length operations may be executed by a separate 8-bit character unit 422.

Floating point execution unit may also be separated into two distinct floating point units, handling either single-precision or double-precision floating point operations. Separation may be advantageous due to differences in the costs of implementing a floating point unit handling only single-precision floating point operations versus a floating point unit handling both single-precision and double-precision floating point operations. A low end implementation may support only single-precision floating point operations, while a high end implementation may support both types of floating point operations. Thus, floating point operations are preferably segregated appropriately between single-precision floating point unit 418 and double-precision floating point unit 420.

It is becoming increasingly common for superscalar processors to provide vector units for a variety of application areas, such as graphics and scientific computing. Therefore, it would be advantageous to provide processor 400 multiple vector units: a 32-byte vector unit 426 to handle byte quantities for graphics, an 8-word vector unit 424 for word items, and a single-precision floating point vector unit 428 and double-precision floating point vector unit 430. These vector units may be made arbitrarily wide, limited only by the bandwidth available to load their values from the memory subsystem.

Unicode string unit 432 has special characteristics. A string may be defined as a sequence of Unicode (2-byte) characters terminating with a null Unicode character. A string register 444 points to the location in memory of the first character in the string. Operations such as string compare, string concatenate, or string subset may be performed by Unicode string unit 432 utilizing string registers 444 as handles. A specific implementation may optionally include additional characteristics of a string, such as the string length or the first few characters from the string, in string registers 444.

Each of the execution units has an associated allocation of registers from dynamically typed registers 434. Again, the determination of the number and distribution of dynamically typed registers 434 associated with a particular execution unit is made based on anticipated use. It also is permissible for an implementation to have multiple execution units of a given type, such as two 32-bit fixed point execution units. In such cases, registers of that type within dynamically typed registers 434 are shared between the multiple execution units. The allocation of a particular execution unit from among the group of units available for that type of operation is dynamic, not specified in the implementation of the architecture. That is, dispatch unit 408 determines which instructions of a particular type are dispatched to a specific execution unit of that type based on availability, register dependence, etc. By careful arrangement of code through compiler techniques, it should be possible to fully exploit the parallelism made possible by multiple execution units.

A compiler may treat dynamically typed registers 434 in processor 400 as a symbol. Binding a register specifier to an execution unit type is natural since the compiler knows the operation type at symbol initialization, which generates a LOAD or CAST instruction. Subroutine linkage conventions will be largely similar to those employed in conjunction with prior art processors. For example, in the callee-save case, the compiler may save those registers among dynamically type registers 434 which it intends to overwrite during execution of the current subroutine. The primary difference is that storing a register will take up space on the stack related to the register type of the caller. Code which manipulates the stack must accommodate this space requirement. A special instruction determines the size of the value in the register being stored. The STORE instruction saves the register type specifier as well as the register value. When a LOAD instruction contains an internal type specifier of 0, a special LOAD is indicated where the type specifier is loaded from memory along with the data to be loaded. With the large number of registers available, the compiler should reduce the overhead of register calls in an application through inlining and linkage conventions which obviate the need for extensive register saving/restoring.

An architecture employing dynamically typed registers could specify that registers associated with certain execution units may not be saved and restored as described above due to the overhead involved. This may be desirable, for example, for vector units. In such instances, the execution unit involved may be treated essentially as a coprocessor for which the software guarantees that the state is not disturbed at a call or a context switch.

Because different implementations may not include all execution units contemplated when compiling an application, the run-time system should provide routines to be executed when an "Unimplemented Execution Unit" trap occurs (e.g., detecting a type specifier of 0). In some cases, such as floating point or vector instructions, software emulation of the instructions using available execution units may be possible.

Figure 5:
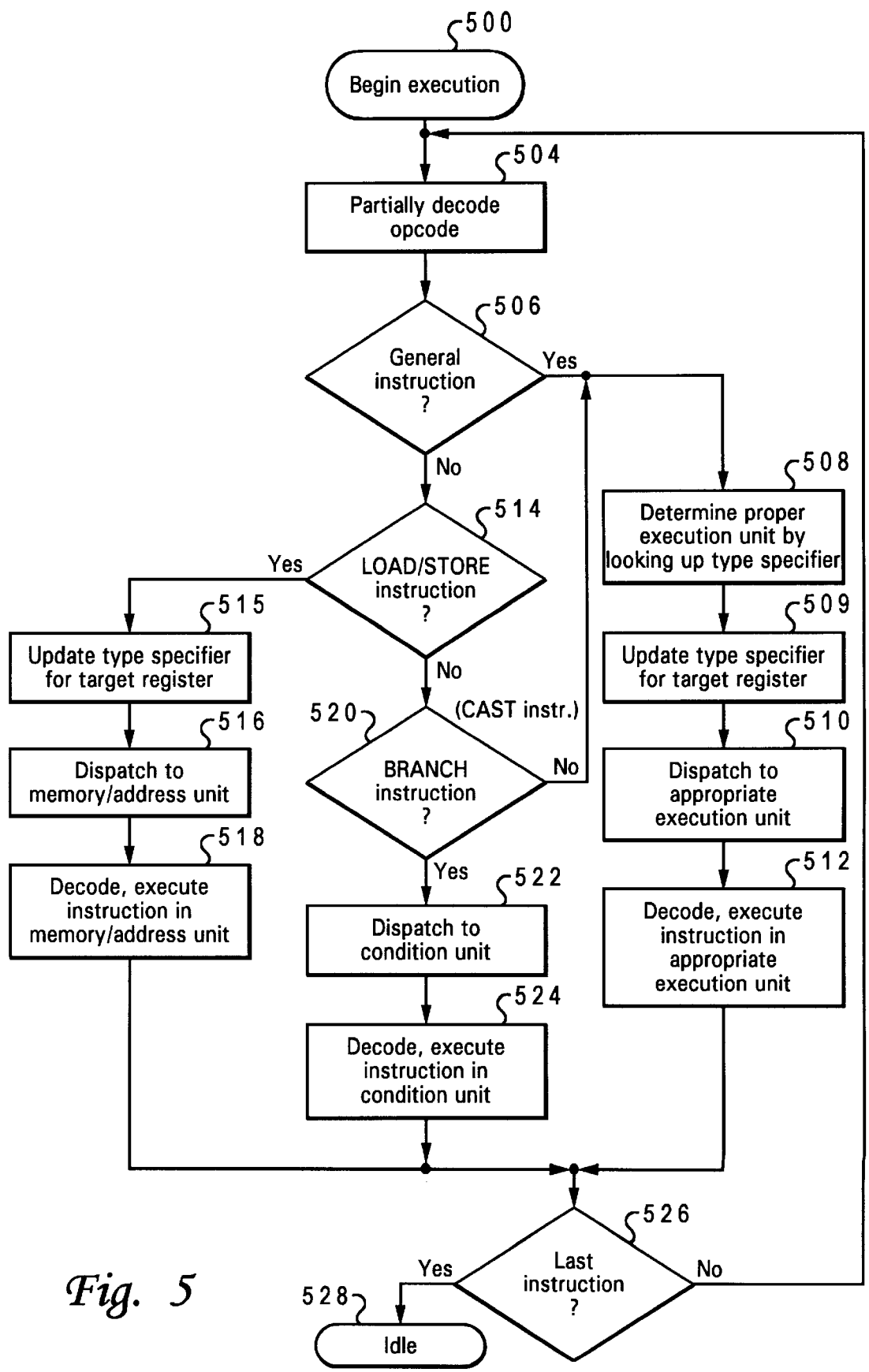
FIG. 5 depicts a high level flowchart for a process for employing dynamically typed registers in accordance with a preferred embodiment of the present invention.

With reference now to FIG. 5, a high level flowchart for a process for employing dynamically typed registers in accordance with a preferred embodiment of the present invention is depicted. The process begins at step 500, which depicts beginning execution of an application in a data processing system including a processor having dynamically typed registers. The process then passes to step 504, which depicts partially decoding the opcode in the first instruction. The process next passes to step 506, which illustrates a determination, based on the partially decoded opcode, of whether the instruction is a general instruction. If so, the process passes sequentially through step 508, which depicts looking up the type specifier for the first source register in the register type table to determine the appropriate execution unit, step 509, which illustrates updating the target register's type specifier to match the type specifier of the first source register, and step 510, which illustrates dispatching the instruction to an appropriate execution unit of the type specified, to step 512, which depicts decoding the instruction at the appropriate execution unit and executing the instruction.

Referring back to step 506, if the partially decoded opcode indicates that the instruction is not a general instruction, the process proceeds instead to step 514, which illustrates a determination of whether the instruction is a LOAD or STORE instruction. If so, the process passes first to step 515, which illustrates in the case of LOAD instructions updating the target register's type specifier to match the type specifier in the instruction, step 516, which depicts dispatching the instruction to a memory or address unit, and then to step 518, which illustrates decoding and execution of the instruction in the memory/address unit. If not, however, the process passes to step 520, which depicts a determination of whether the instruction is a BRANCH instruction. If so, the process passes to step 522, which illustrates dispatching the instruction to a condition unit, and to step 524, which depicts decoding and execution of the instruction in the condition unit.

If it is determined at step 520 that the instruction is not a BRANCH instruction, and having eliminated general instructions and LOAD and STORE instructions in previous steps, then for the embodiment described above the instruction must be a CAST instruction. The process thus passes to step 508, which illustrates looking up the type specifier, this time from the first source operand of the instruction. The target register's type specifier is updated to match the type specified in the target field of the instruction. The process then passes to step 510, which depicts dispatching the instruction to the appropriate type of execution unit, and then to step 512, which illustrates decoding and executing the instruction.

From each of steps 512, 518, and 524, the process passes to step 526, which depicts a determination of whether the instruction was the last instruction to be executed. If so, the process returns to step 504; if not, the process passes to step 528, which illustrates the process becoming idle. It will be understood by those of ordinary skill that although the process is depicted as occurring sequentially, many portions of the process may be performed simultaneously. For example, while an execution unit is decoding and executing an instruction in step 512, a dispatch unit may partially decode the next instruction in step 504.

Employment of dynamically typed registers permits a compiler to dynamically allocate a large pool of registers to include more registers of one type in exchange for fewer registers of a second type, reducing register bottleneck. Registers of a certain type may be associated with an execution unit operating predominantly on operands of that type, reducing both the need to bus register values across large distances in the processor and the need to provide large numbers of ports in the register files.

Employing dynamically typed registers also allows easy extensibility of instruction sets, reducing the problem of accommodating new functions and data types once an initial instruction set has been defined. If the processor included field programmable gate arrays, new function types and new interpretations of opcodes could be created dynamically, programming these gate arrays through software instructions.

As an alternative to using larger type specifiers, a greater range of register types could be introduced at the expense of extra work in determining the register type. Type registers, containing type specifiers, could be included in the processor architecture. LOAD and CAST instructions could be defined to operate on type registers rather than (or in addition to) directly encoding type specifiers. A 3-bit type register address could address up to 8 different types, an amount which may be large enough to support the working instruction set of most applications. Each type register may contain or point to one type specifier within the complete set of type specifiers, which may number 64, 128, or more. Special instructions loading these type registers would allow dynamic redefinition of the complement of 8 operation types with which a processor works at any given time.

The instruction set accompanying use of dynamically typed registers provides generic instructions for converting a register value from one data type to another, reducing the demands on the instruction opcode space and eliminating the need to transfer converted values to memory before loading them into new registers. Type specifiers for a register value may be stored in memory with the register value itself, simplifying the problem of saving and restoring registers at subroutine call boundaries and at context switch points. Most instructions in the instruction set allow one and only one processor resource (execution unit and associated registers) to be affected by an instruction, reducing dependency analysis problems and allowing for easier scheduling of instructions.

The instruction set also makes better use of the instruction opcode space by allowing interpretation of the opcode after determining the type of execution unit which will execute the instruction, reducing the complexity of decoding instructions. The polymorphic nature of the opcodes may be further extended to allow operations to be determined by the type specifier associated with the all source operands rather than just the first source operand. This allows the opcode space to be further compacted, and may be practical if the opcode decoder in the execution unit is extended to decode operand types at the same time as the opcode field itself is decoded.

While the invention has been particularly shown and described with reference to a preferred embodiment, it will be understood by those skilled in the art that various changes in form and detail may be made therein without departing from the spirit and scope of the invention.

What is claimed is:

1. A method of dynamically typing registers in a processor, comprising:
   associating a register type specifier with a register specifier, wherein the register type specifier identifies an execution unit to which the register specifier is allocated; and
   mapping the register specifier to a register within a plurality of registers within the processor.

2. The method of claim 1, wherein the step of mapping the register specifier to a register further comprises mapping the register specifier to a register implemented in a memory.

3. The method of claim 1, wherein the step of mapping the register specifier to a register further comprises mapping the register specifier to a fast register implemented close to an execution unit, the fast register acting as an associative cache for a register implemented elsewhere.

4. The method of claim 1, wherein the step of mapping the register specifier further comprises interpreting the register specifier as mapping to a register associated with an execution unit within the processor, the execution unit performing operations compatible with the register type specifier.

5. The method of claim 1, further comprising:

storing the register specifier and the associated register type specifier in a register type table within the processor.

6. The method of claim 1, wherein the step of associating a register type specifier with a register specifier further comprises executing an instruction altering the register type specifier associated with the register specifier.

7. The method of claim 6, wherein the step of executing an instruction further comprises executing an instruction selected from the group consisting of a LOAD instruction and a CAST instruction.

8. The method of claim 6, further comprising:

responsive to the altering the register type specifier associated with the register specifier, mapping the register specifier to a different register within the plurality of registers within the processor, the different register associated with a different execution unit within the processor performing operations compatible with the altered register type specifier.

9. The method of claim 1, further comprising:

storing the register specifier and the associated register type specifier in a register type table within the processor, wherein the step of associating a register type specifier with a register specifier further comprises executing an instruction altering the register type specifier associated with the register specifier and stored in the register type table.

10. The method of claim 1, further comprising:

associating a register type specifier with each register specifier within a plurality of register specifiers;

storing each register specifier within the plurality of register specifiers and the associated register type specifier in a register type table within the processor; and mapping each register specifier within the plurality of register specifiers to an individual register within the plurality of registers, wherein an execution unit within the processor operating on the individual register is compatible with the associated register type specifier.

11. The method of claim 1, wherein the step of associating a register type specifier with a register specifier further comprises storing the register type specifier in a type register, the register type specifier selected from among a plurality of register type specifiers and associated with the register specifier.

12. A processor having dynamically typed registers, comprising:

association means for associating a register type specifier with a register specifier, wherein the register type specifier identifies an execution unit to which the register specifier is allocated; and mapping means for mapping the register specifier to a register within a plurality of registers within the processor.

13. The processor of claim 12, wherein the mapping means further comprises means for mapping the register specifier to a register implemented in a memory.

14. The processor of claim 12, wherein the mapping means further comprises means for mapping the register specifier to a fast register implemented close to an execution unit, the fast register acting as an associative cache for a register implemented elsewhere.

15. The processor of claim 12, wherein the mapping means further comprises means for interpreting the register specifier as mapping to a register associated with an execution unit within the processor, the execution unit performing operations compatible with the register type specifier.

16. The processor of claim 12, further comprising:

memory means for storing the register specifier and the associated register type specifier in a register type table within the processor.

17. The processor of claim 12, wherein the association means further comprises execution means for executing an instruction altering the register type specifier associated with the register specifier.

18. The processor of claim 17, wherein the execution means further comprises means for executing an instruction selected from the group consisting of a LOAD instruction and a CAST instruction.

19. The processor of claim 17, further comprising:

mapping means, responsive to the altering the resister type specifier associated with the register specifier, for mapping the register specifier to a different register within the plurality of registers within the processor, the different register associated with a different execution unit within the processor performing operations compatible with the altered register type specifier.

20. The processor of claim 12, further comprising:

memory means for storing the register specifier and the associated register type specifier in a register type table within the processor, wherein the association means further comprises means for executing an instruction altering the register type specifier associated with the register specifier and stored in the register type table.

21. The processor of claim 12, further comprising:

association means for associating a register type specifier with each register specifier within a plurality of register specifiers;

memory means for storing each register specifier within the plurality of register specifiers and the associated register type specifier in a register type table within the processor; and mapping means for mapping each register specifier within the plurality of register specifiers to an individual register within the plurality of registers, wherein an execution unit within the processor operating on the individual register is compatible with the associated register type specifier.

22. The processor of claim 12, wherein the association means further comprises means storing the register type specifier in a type register, the register type specifier selected from among a plurality of register type specifiers and associated with the register specifier.

23. A method of implementing dynamically typed registers in a processor having a plurality of execution units, each execution unit having a different register type specifier, comprising:

storing a register specifier for a plurality of registers in a register type table in the processor, wherein each register within the plurality of registers is associated with a different execution unit and a register type specifier for a register identifies an execution unit to which the register specifier is allocated; and storing the register type specifier in an entry in the register type table corresponding to the register specifier, the stored register type specifier identifying an execution unit within the plurality of execution units; and responsive to an instruction containing the register specifier, employing a register within the plurality of registers associated with the execution unit identified by the stored register type specifier.

24. The method of claim 23, further comprising:

storing a plurality of register specifiers in the register type table, each register specifier in the plurality of register specifiers identifying one of a plurality of registers, wherein each register within the plurality of registers is associated with a different execution unit.

25. The method of claim 24, further comprising:

storing a register type specifier in an entry in the register type table corresponding to a register specifier for each register specifier in the plurality of register specifiers, the stored register type specifier identifying an execution unit within the plurality of execution units.

26. The method of claim 23, further comprising:

altering the stored register type specifier; and responsive to an instruction containing the register specifier, employing a register within the plurality of registers associated with the execution unit identified by the altered stored register type specifier.

27. A method of dispatching an instruction in a processor including dynamically typed registers and a plurality of execution units, each execution unit having a different register type specifier, comprising:

obtaining a register type specifier for an operand register specifier in the instruction from a register type table wherein the register type specifier identifies an execution unit to which the operand register specifier is allocated; and dispatching the instruction to an execution unit associated with the register type specifier, wherein instructions may be efficiently dispatched to appropriate execution units.

28. The method of claim 27, further comprising:

responsive to detecting an embedded register type specifier in the instruction, dispatching the instruction to an execution unit associated with the register type specifier.

29. A method of dynamically allocating register specifiers in a processor having a plurality of execution units, comprising:

allocating each register specifier within a plurality of register specifiers to an execution unit in the processor;

initializing a register type table including a register specifier within the plurality of register specifiers and an associated register type specifier for a corresponding execution unit to which the register specifier is allocated; and reassigning at least one register specifier within the plurality of register specifiers to a different execution unit.

30. The method of claim 29, further comprising:

updating the register type table to reflect the reassignment of the at least one register specifier.

31. A superscalar processor, comprising:

a plurality of execution units; and a plurality of registers, the registers addressed by a plurality of register specifiers, the processor having a first mode of operation in which a register specifier within the plurality of register specifiers maps to a first register within the plurality of registers and a second mode of operation in which the register specifier maps to a second register within the plurality of registers.

32. The processor of claim 31, further comprising:

a register type table containing a register type specifier for each register within the plurality of registers, the register type specifier mapping a register specifier within the plurality of register specifiers to a register within the plurality of registers.

33. A method of compiling instructions for a superscalar processor, comprising:

mapping a register address to a first register for a first portion of a set of instructions;

mapping the register address to a second register for a second portion of the set of instructions; and storing the set of instructions in a memory.

34. The method of claim 33, wherein the step of mapping a register address to a first register further comprises associating a first register type identifier with the register address, and the step of mapping the register address to a second register further comprises associating a second register type identifier with the register address.

* * * * *